United States Patent
Mehta et al.

(10) Patent No.: US 10,554,677 B1
(45) Date of Patent: Feb. 4, 2020

(54) DETECTION OF REAL USER INTERACTION WITH A MOBILE APPLICATION

(71) Applicant: Cequence Security, Inc., Sunnyvale, CA (US)

(72) Inventors: Shreyans Mehta, Los Altos, CA (US); Ameya Talwalkar, Saratoga, CA (US)

(73) Assignee: CEQUENCE SECURITY, INC., Sunnyvale, CA (US)

( * ) Notice: Subject to any disclaimer, the term of this patent is extended or adjusted under 35 U.S.C. 154(b) by 220 days.

(21) Appl. No.: 15/077,479

(22) Filed: Mar. 22, 2016

Related U.S. Application Data

(60) Provisional application No. 62/138,777, filed on Mar. 26, 2015.

(51) Int. Cl.
H04L 29/06 (2006.01)

(52) U.S. Cl.
CPC ........ *H04L 63/1425* (2013.01); *H04L 63/126* (2013.01)

(58) Field of Classification Search
CPC .......................... H04L 63/1425; H04L 63/126
See application file for complete search history.

(56) References Cited

U.S. PATENT DOCUMENTS

| | | | |
|---|---|---|---|
| 2003/0014518 A1* | 1/2003 | Richard | H04L 41/00 709/224 |
| 2014/0337955 A1* | 11/2014 | Mendelovich | H04L 63/0807 726/9 |
| 2015/0112892 A1* | 4/2015 | Kaminsky | G06N 7/00 706/11 |
| 2015/0156214 A1* | 6/2015 | Kaminsky | H04L 63/1416 726/22 |

* cited by examiner

*Primary Examiner* — Baotran N To

(57) ABSTRACT

Techniques to facilitate detection of real user interaction with mobile applications are disclosed herein. In at least one implementation, a mobile application that generates a web service request is executed on a wireless communication device. The wireless communication device executes a client security component of the mobile application to include user behavior attributes in the web service request, and utilizes a mobile application programming interface to transfer the web service request including the user behavior attributes for delivery to a web server. The web server executes a server security component of a web service to extract the user behavior attributes from the web service request and process the user behavior attributes to determine whether or not the mobile application is being operated by a human user.

20 Claims, 5 Drawing Sheets

US 10,554,677 B1

DETECTION OF REAL USER INTERACTION WITH A MOBILE APPLICATION

RELATED APPLICATIONS

This application claims the benefit of, and priority to, U.S. Provisional Patent Application No. 62/138,777, entitled "DETECTION OF REAL USER INTERACTION WITH A MOBILE APPLICATION", filed Mar. 26, 2015, which is hereby incorporated by reference in its entirety for all purposes.

TECHNICAL BACKGROUND

Traditional web services that are accessed by a web browser typically utilize hypertext markup language (HTML) and Javascript, which provide the capability to determine legitimate use of the web service, such as presenting Completely Automated Public Turing tests to tell Computers and Humans Apart (CAPTCHAs) and other challenge questions to the user. However, unlike traditional web services, wireless communication devices often employ mobile applications to communicate with web servers. Mobile applications typically pull data down from web servers for display to the user, and also allow the user to modify the data and submit it back to the server.

Mobile applications commonly utilize mobile application programming interfaces (APIs) to communicate with external web services and provide their functionality to the user. The communication between native mobile applications and mobile APIs on the web servers is typically done using JavaScript Object Notation (JSON), Extensible Markup Language (XML), and other protocols that do not employ security techniques but are simply used to provide an exchange of data between the client and server. Thus, the core application communication between the mobile application and the web service utilizes a mobile API with no security in place to validate the legitimacy of the request. In addition, various kinds of toolkits and software may be used to automate user interactions on mobile devices. Unfortunately, these automation techniques may be exploited by malicious users to launch various security attacks on the web service.

Overview

A method of operating a communication system to facilitate detection of real user interaction with mobile applications is disclosed. The method comprises, in a wireless communication device, executing a mobile application that generates a web service request and executing a client security component of the mobile application to include user behavior attributes in the web service request. The method further comprises, in the wireless communication device, utilizing a mobile application programming interface (API) to transfer the web service request including the user behavior attributes for delivery to a web server. The method further comprises, in the web server, executing a server security component of a web service to extract the user behavior attributes from the web service request and process the user behavior attributes to determine whether or not the mobile application is being operated by a human user.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

The distinction between a real human user and an automation interacting with a mobile application is important from a security standpoint. A human user interacting with a mobile application provides a higher degree of confidence that the application is being used legitimately, which is critical to applications that deal with financial transactions, sensitive personal information, and other interactions where security is paramount. Various kinds of toolkits and software may be used to automate user interactions on mobile devices, but unfortunately these automation techniques may be exploited by malicious users to launch various security attacks using mobile applications. Therefore, determining that a mobile application is being operated by a real human user is a good indicator that the mobile application is being used for legitimate purposes.

Implementations are disclosed herein for detecting real human interaction with a mobile application running on a mobile device. In at least one implementation, user behavior attributes associated with user interactions with the mobile application are monitored from within the application. The mobile application can then send the collected user behavior attributes to a server for processing and determining whether or not the mobile application is being operated by a human user.

Figure 1:
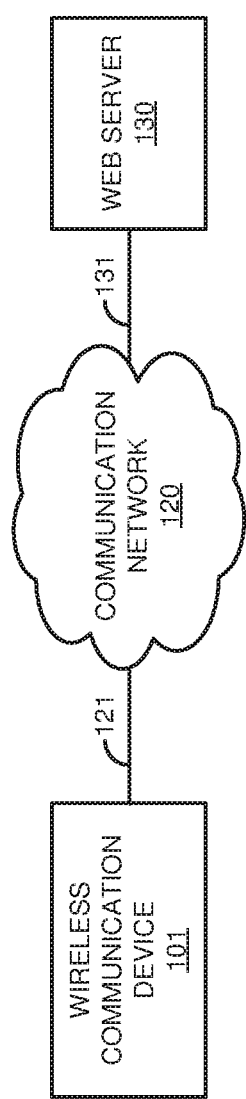
FIG. 1 is a block diagram that illustrates a communication system.

FIG. 1 is a block diagram that illustrates communication system 100. Communication system 100 includes wireless communication device 101, communication network 120, and web server 130. Wireless communication device 101 and communication network 120 communicate over communication link 121. Communication network 120 and web server 130 are in communication over communication link 131.

In operation, wireless communication device 101 executes a mobile application that collects security information at runtime from wireless communication device 101 and its operating environment. In some implementations, the security information collection process may be performed by a client security component embedded into the application. The security information collected by the application comprises user behavior attributes indicative of how a user is operating wireless communication device 101. For example, the user behavior attributes may include behavior that indicates usage of wireless communication device 101 by a human operator, such as the velocity and sequence of navigation between various views, displays, pages, or other content of the application, the speed of user input, such as the time between keystrokes or other user commands, and any other information indicative of device usage. Presence or absence of a combination of these user behavior attributes can be used to validate a web service request submitted by the mobile application executing on wireless communication device 101. An exemplary implementation for validating a web service request from an application executing on wireless communication device 101 will now be discussed with respect to FIG. 2.

Figure 2:
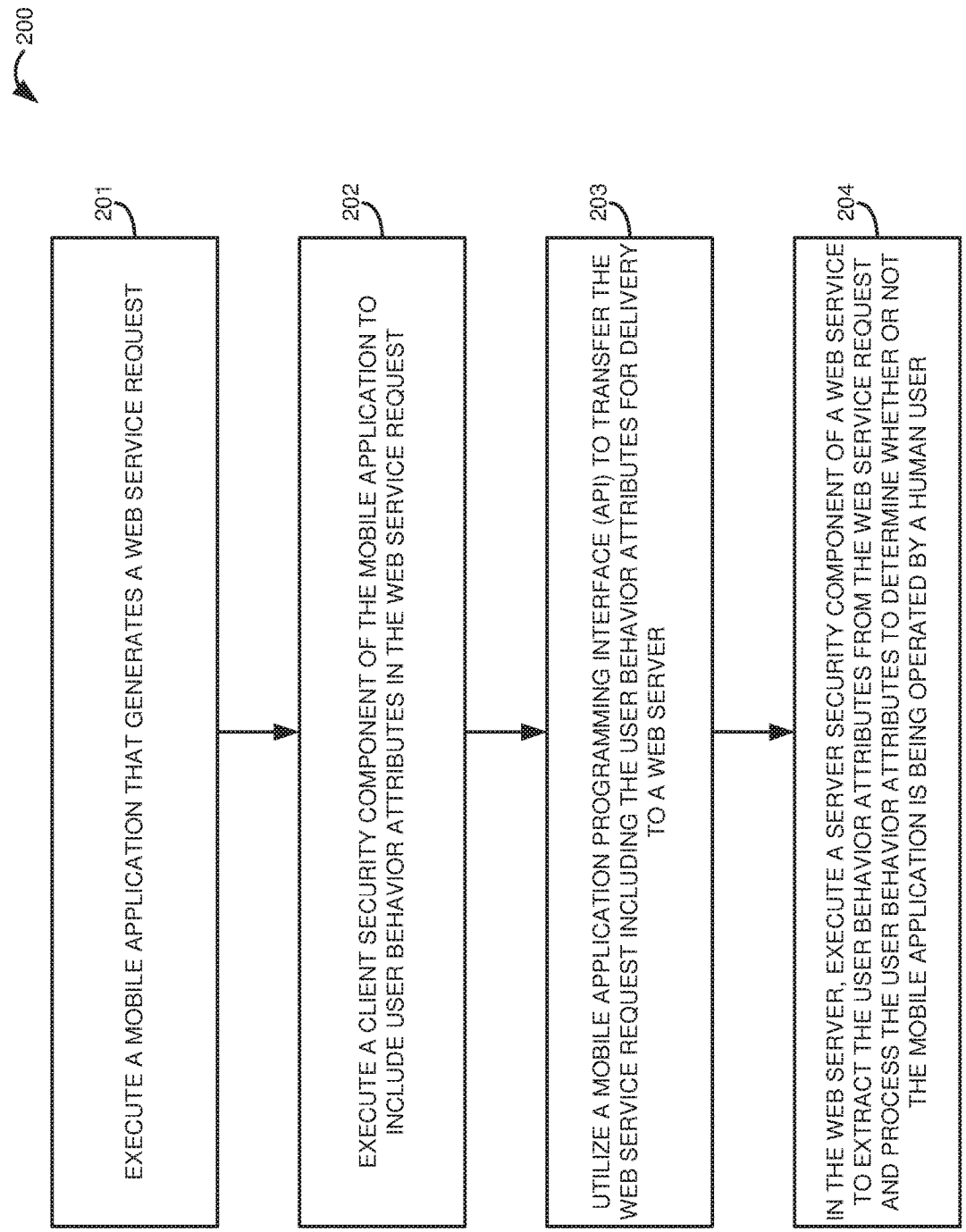
FIG. 2 is a flow diagram that illustrates an operation of the communication system.

FIG. 2 is a flow diagram that illustrates an operation 200 of communication system 100. The operation 200 shown in FIG. 2 may also be referred to as detection process 200 herein. The steps of the operation are indicated below parenthetically. The following discussion of operation 200 will proceed with reference to wireless communication device 101 and web server 130 of FIG. 1 in order to illustrate its operations, but note that the details provided in FIG. 1 are merely exemplary and not intended to limit the scope of process 200 to the specific implementation shown in FIG. 1.

Operation 200 may be employed by wireless communication device 101 and web server 130 to facilitate detection of real user interaction with mobile applications. As shown in the operational flow of FIG. 2, wireless communication device 101 executes a mobile application that generates a web service request (201). The mobile application could comprise any software application that may be executed on wireless communication device 101. For example, the application could comprise a streaming media application, video application, audio application, news client, gaming application, sports application, social media application, web browser, messaging application, or any other software application—including combinations thereof. The web service request is typically generated by the application in response to some user input, such as a user launching the application, clicking a link presented by the application, entering data into a form field on the application, or responsive to any other user action. However, in some examples, the web service request could be automatically generated by the application, including in response to a request from another application. Typically, the web service request comprises instructions to direct a web service to either retrieve data from web server 130 and/or instructions to store data transferred by wireless communication device 101 in web server 130. For example, the web service request could comprise a query, message, notification, command, request, instruction, or any other communications between wireless communication device 101 and web server 130, including combinations thereof.

Wireless communication device 101 executes a client security component of the mobile application to include user behavior attributes in the web service request (202). The user behavior attributes may be gleaned from the manner in which wireless communication device 101 is utilized. The client security component of the mobile application typically collects the user behavior attributes by monitoring and observing user interactions with the mobile application executing on wireless communication device 101. For example, the user behavior attributes monitored by the client security component of the mobile application may be associated with the manner in which the user navigates through the mobile application, provides user input into the application, and otherwise engages with the mobile application.

In some implementations, the user behavior attributes could include the velocity at which the user navigates through the various views, displays, pages, or other content displayed by the mobile application. Typically, a human operator may take a varying amount of time to navigate from one view to another, whereas an automation may manipulate an application interface in a fast, consistent, and mechanical manner. For example, a human user may read through a first page view, occasionally scrolling up or down, select a button to access another page view, select a text box and enter some textual input, and select a submit button, and all of this user input and any other interactions can be tracked and recorded by the client security component of the mobile application for inclusion in the user behavior attributes.

The client security component of the mobile application could also monitor the sequence of views navigated by the user while interacting with the application. Typically, a human user may explore and discover different views of a mobile application differently from how an automation would utilize the application. For example, an automation may navigate through desired pages in a predetermined way, such as adding items to a shopping cart and proceeding through a checkout process, as the mobile application views are previously learned by the malicious user running the automation. In contrast, a legitimate human user may navigate through the different views of an application in a varying sequence, possibly viewing the same page or pages multiple times as the user becomes familiar with the application interface.

In addition to the manner in which the user navigates through the various views of the application, the client security component of the mobile application could also monitor the speed at which the user provides textual input and other commands into the application. For example, a real human user will typically take a varying degree of time between keystrokes when entering text into various input fields of the application. In contrast, an automation may feed-in keyboard input much faster than a real human is capable, since automation techniques often allow for filling in textual input without the use of a keyboard and other input mechanisms.

The client security component of the mobile application could also monitor for erroneous input provided by the user. An automation typically interacts with an application in a predetermined and flawless manner due to its algorithmic programming, whereas a human operator is prone to occasionally make mistakes. For example, the client security component of the mobile application could track the use of the delete or backspace keys, incompatible information entered into the wrong text field, input fields missing required information on a first submission attempt that are subsequently corrected on the next submission attempt, and any other non-standard or erroneous user input that may be indicative of real human interaction. Note that all of the factors listed above are merely exemplary, and additional information that may be used to determine if the mobile application is being operated by a human user could be included in the user behavior attributes and is within the scope of this disclosure.

The mobile application executing on wireless communication device 101 then utilizes a mobile application programming interface (API) to transfer the web service request including the user behavior attributes for delivery to web server 130 (203). Typically, the mobile API is used as an interface to exchange data between a mobile application executing on device 101 and a web service provided by web server 130. However, since the mobile API typically allows this data exchange to occur without regard to security, web server 130 may utilize the user behavior attributes included in the web service request to verify and validate the request. In at least one implementation, the client security component of the mobile application embeds the user behavior attributes into the web service request before the request is transferred to web server 130. The user behavior attributes may be transparent to the application, the mobile API, and the web service in some implementations.

Web server 130 executes a server security component of a web service to extract the user behavior attributes from the web service request and process the user behavior attributes to determine whether or not the mobile application is being operated by a human user (204). Typically, the server security component analyzes all of the user behavior attributes included in the web service request to detect real user interactions with the mobile application. For example, the presence of multiple factors could indicate that the mobile application is being operated by a human user. All of the user behavior attributes listed above do not need to be present for the server security component of the web service to determine if the mobile application is being operated by a human user, but each factor strengthens the determination. In some implementations, a threshold number of user behavior attributes could be used to determine when enough of the attributes exist to determine that the mobile application is being used by a real, human operator. For example, the server security component could compare a total number of the user behavior attributes received in the web service request to a threshold number of attributes to determine that the mobile application is being operated by a human user when the total number of the user behavior attributes exceeds the threshold number. The greater the number of attributes present in the web service request, the higher the likelihood that the application and its request are legitimate, so the threshold number of attributes could be increased to provide greater security protection for the web service in some examples.

If the server security component of the web service determines that the mobile application is being operated by a human and not an automaton, this determination may be used as at least one factor to validate the web service request as a legitimate request. For example, the server security component of the web service could validate the web service request based, at least in part, on the determination that the mobile application is being operated by the human user, and provide the web service request to the web service upon successful validation. In some implementations, once the request is validated, the server security component of the web service removes the user behavior attributes and any other security information from the web service request and provides the request to the web service without the user behavior attributes. In this manner, the included attributes and the request validation process remain transparent to the web service, thereby not requiring any modifications to the communication protocol and mobile API used between the mobile application and the web service.

Advantageously, the client security component of the mobile application transparently adds various user behavior attributes to web service requests when the application communicates with a web service using a mobile API. The user behavior attributes included in the web service request enable the server security component of the web service to determine whether or not the mobile application is being operated by a human user. If the web service determines that a real human user is interacting with the mobile application, this may be used as an indication that the web service request issued from the mobile application is a legitimate request, and the web service may process the request. The user behavior attributes included in the web service request enables the server security component of the web service to ensure that only genuine native applications with legitimate user behavior are allowed to use the web service, and any possible exploitation of the mobile API to perform malicious actions can be blocked. By securing the web service from malicious use, the techniques described herein provide the technical advantage of reducing the load on the processor, network components, and other elements of web server 130 by eliminating illegitimate requests, while also safeguarding the information of users of the web service. Further, because the collection, exchange, and processing of the various user behavior attributes is handled transparently by the security components of the mobile application and the web service, these two endpoints are unaware of the additional security measures and validation that occurs to safeguard the information exchange. In this manner, the web service has a higher degree of confidence in the legitimacy of the web service request if the web service determines that the mobile application is being operated by a human user, and possible exploitation of the mobile API to perform malicious actions can be blocked in the alternative.

Referring back to FIG. 1, wireless communication device 101 may comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and a communication network.

Communication network 120 could comprise multiple network elements such as routers, gateways, telecommunication switches, servers, processing systems, or other communication equipment and systems for providing communication and data services. In some examples, communication network 120 could comprise wireless communication nodes, telephony switches, Internet routers, network gateways, computer systems, communication links, or some other type of communication equipment—including combinations thereof. Communication network 120 may also comprise optical networks, asynchronous transfer mode (ATM) networks, packet networks, local area networks (LAN), metropolitan area networks (MAN), wide area networks (WAN), or other network topologies, equipment, or systems—including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, or some other communication format—including combinations thereof. In some examples, communication network 120 includes further access nodes and associated equipment for providing communication services to several computer systems across a large geographic region.

Web server 130 comprises a processing system and communication transceiver. Web server 130 may also include other components such as a router, server, data storage system, and power supply. Web server 130 may reside in a single device or may be distributed across multiple devices. Web server 130 may be a discrete system or may be integrated within other systems—including other systems within communication system 100. In some examples, web server 130 could comprise a network switch, router, switching system, packet gateway, network gateway system, Internet access node, application server, database system, service node, firewall, or some other communication system—including combinations thereof.

Communication links 121 and 131 use metal, air, space, optical fiber such as glass or plastic, or some other material as the transport medium—including combinations thereof. Communication links 121 and 131 could use various communication protocols, such as TDM, IP, Ethernet, telephony, optical networking, hybrid fiber coax (HFC), communication signaling, wireless protocols, or some other communication format—including combinations thereof. Communication links 121 and 131 could be direct links or may include intermediate networks, systems, or devices.

Figure 3:
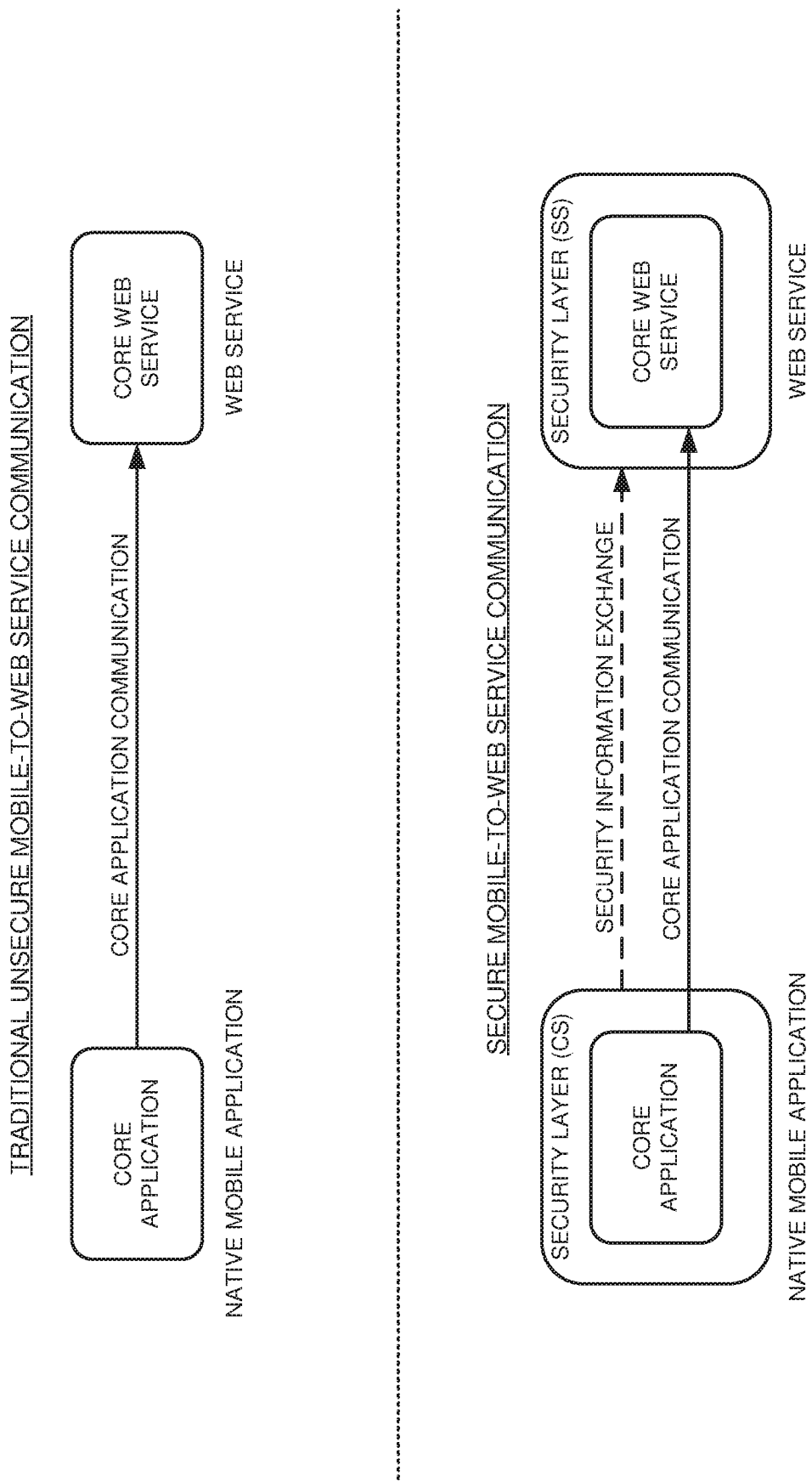
FIG. 3 is a flow diagram that illustrates an operation of a communication system in an exemplary embodiment.

FIG. 3 is a flow diagram that illustrates an operation of communication system 100 in an exemplary embodiment. The techniques described in FIG. 3 could be executed by the elements of communication system 100 and could be combined with operation 200 of FIG. 2 in some implementations. FIG. 3 is divided into two sections, separated by a dotted line. The top half of FIG. 3, labeled "Traditional Unsecure Mobile-To-Web Service Communication", illustrates a typical, unsecure data exchange between a native mobile application executing on wireless communication device 101 and a web service provided by web server 130. Traditional web services that are accessed by a web browser typically utilize hypertext markup language (HTML) and Javascript, which provide the capability to bundle code along with the data that may be used to determine legitimate use of the web service, such as presenting Completely Automated Public Turing tests to tell Computers and Humans Apart (CAPTCHAs) and other challenge questions to the user.

However, native mobile applications utilize mobile APIs to communicate with external web services and provide their functionality to users. Typically, most of the data utilized by a mobile application resides on the server, and the server also commonly performs operations on the data such as addition, deletion, and modification, often in response to a user request made to the application. The communication between native mobile applications and mobile APIs on the web servers is typically done using JavaScript Object Notation (JSON), Extensible Markup Language (XML), and other protocols that do not employ security techniques but are simply used to provide an exchange of data between the client and server. Thus, the core application communication between the mobile application and the web service utilizes a mobile API with no security in place to validate the legitimacy of the request. Unfortunately, these weaknesses are easily exploited to bypass the security solutions used on traditional web services and allow unauthorized communication with web servers using the mobile API, subjecting the web service to possible malicious use. For example, a malicious user could attempt unauthorized user login, fake account creation, fraudulent data submission to the server, data theft from the server by impersonating a user/device, and others.

Turning now to the lower portion of FIG. 3, labeled "Secure Mobile-To-Web Service Communication", security components are added to the native client application as well as the web service. In FIG. 3, the security component added to the mobile application is designated as client side (CS), and the security layer added to the web service is designated as server side (SS). When a legitimate native mobile application communicates with the web service, the CS security layer transparently injects additional security information to the communication, including the user behavior attributes discussed above with respect to FIG. 2, device attributes, unique transaction identifiers, attributes that are indicative of the mobile application being executed on a physical mobile device, and any other pertinent data. This security information is then verified by the SS security layer and used to determine legitimate or malicious intent. One factor weighing in favor of legitimate intent is the determination that the mobile application is being operated by a real human user. Upon determining legitimate intent, the SS security layer then strips off the security information from the web request before the request is provided to the actual web service. In this manner, the security information and validation determination remain transparent to the mobile application and the web service, allowing them to utilize the original communication protocol used to exchange data between the mobile application and the web service without modification. As such, the two endpoints are unaware that the injection and filtering of additional security information has occurred. The CS and SS security layers work to ensure that only legitimate native mobile applications with clean user behavior are allowed to use the web service, and any possible exploitation of mobile APIs is blocked.

Beneficially, the CS security component transparently adds additional security information to a web request when a native mobile application communicates with web services using mobile APIs. The security information is then inspected, validated, and filtered by the SS security component at the web server as described above, thereby securing the mobile APIs used by the mobile application.

Figure 4:
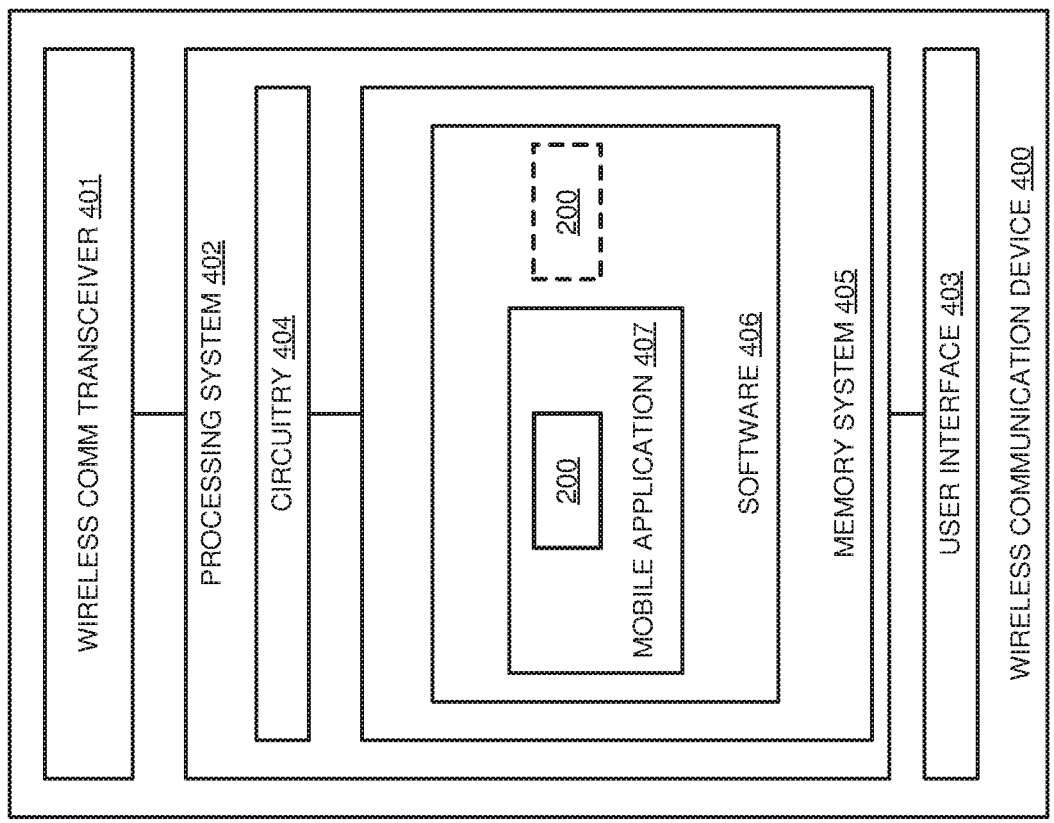
FIG. 4 is a block diagram that illustrates a wireless communication device.

FIG. 4 is a block diagram that illustrates wireless communication device 400. Wireless communication device 400 provides an example of wireless communication device 101, although device 101 could use alternative configurations. Wireless communication device 400 comprises wireless communication transceiver 401, processing system 402, and user interface 403. Processing system 402 is linked to wireless communication transceiver 401 and user interface 403. Processing system 402 includes processing circuitry 404 and memory system 405 that stores operating software 406. Operating software 406 comprises mobile application 407 which itself includes detection process 200. Detection process 200 may optionally be implemented separately from mobile application 407. Wireless communication device 400 may include other well-known components such as a battery and enclosure that are not shown for clarity. Wireless communication device 400 may comprise a telephone, computer, e-book, mobile Internet appliance, media player, game console, wireless network interface card, or some other wireless communication apparatus, including combinations thereof.

Wireless communication transceiver 401 comprises RF communication circuitry and an antenna. The RF communication circuitry typically includes an amplifier, filter, RF modulator, and signal processing circuitry. Wireless communication transceiver 401 may also include a memory system, software, processing circuitry, or some other communication device. Wireless communication transceiver 401 may use various protocols, such as CDMA, GSM, UMTS, HSPA, EV-DO, EV-DO rev. A, 3GPP LTE, LTE Advanced, WiMAX, Wi-Fi, Bluetooth, Internet, telephony, or some other wireless communication format. Wireless communication transceiver 401 may be configured to utilize a mobile application programming interface to transfer a web service request including user behavior attributes for delivery to a web server.

User interface 403 comprises components that interact with a user to receive user inputs and to present media and/or information. User interface 403 may include a speaker, microphone, buttons, lights, display screen, touchscreen, touch pad, scroll wheel, communication port, or some other user input/output apparatus—including combinations thereof. User interface 403 may be omitted in some examples.

Processing circuitry 404 comprises microprocessor and other circuitry that retrieves and executes operating software 406 from memory system 405. Processing circuitry 404 may comprise a single device or could be distributed across multiple devices—including devices in different geographic areas. Processing circuitry 404 may be embedded in various types of equipment. Processing circuitry 404 is typically mounted on a circuit board that may also hold memory system 405 and portions of wireless communication transceiver 401 and user interface 403. Memory system 405 comprises a non-transitory computer readable storage medium, such as a disk drive, flash drive, data storage circuitry, or some other hardware memory apparatus. Memory system 405 may comprise a single device or could be distributed across multiple devices—including devices in different geographic areas. Memory system 405 may be embedded in various types of equipment. In some examples, a computer apparatus could comprise memory system 405 and operating software 406. Operating software 406 comprises computer programs, firmware, or some other form of machine-readable processing instructions. Operating software 406 may include an operating system, utilities, drivers, network interfaces, applications, or some other type of software. In this example, operating software 406 comprises mobile application 407, although software 406 could have alternative configurations in other examples.

When executed by processing circuitry 404, operating software 406 directs processing system 402 to operate wireless communication device 400 as described herein for wireless communication device 101 when executing detection process 200 or variations thereof. In particular, operating software 406 may direct processing system 402 to execute mobile application 407 that generates a web service request. Further, operating software 406 may direct processing system 402 to execute a client security component of mobile application 407 to include user behavior attributes in the web service request. In addition, operating software 406 may direct processing system 402 to utilize a mobile application programming interface to transfer the web service request including the user behavior attributes for delivery to a web server.

Figure 5:
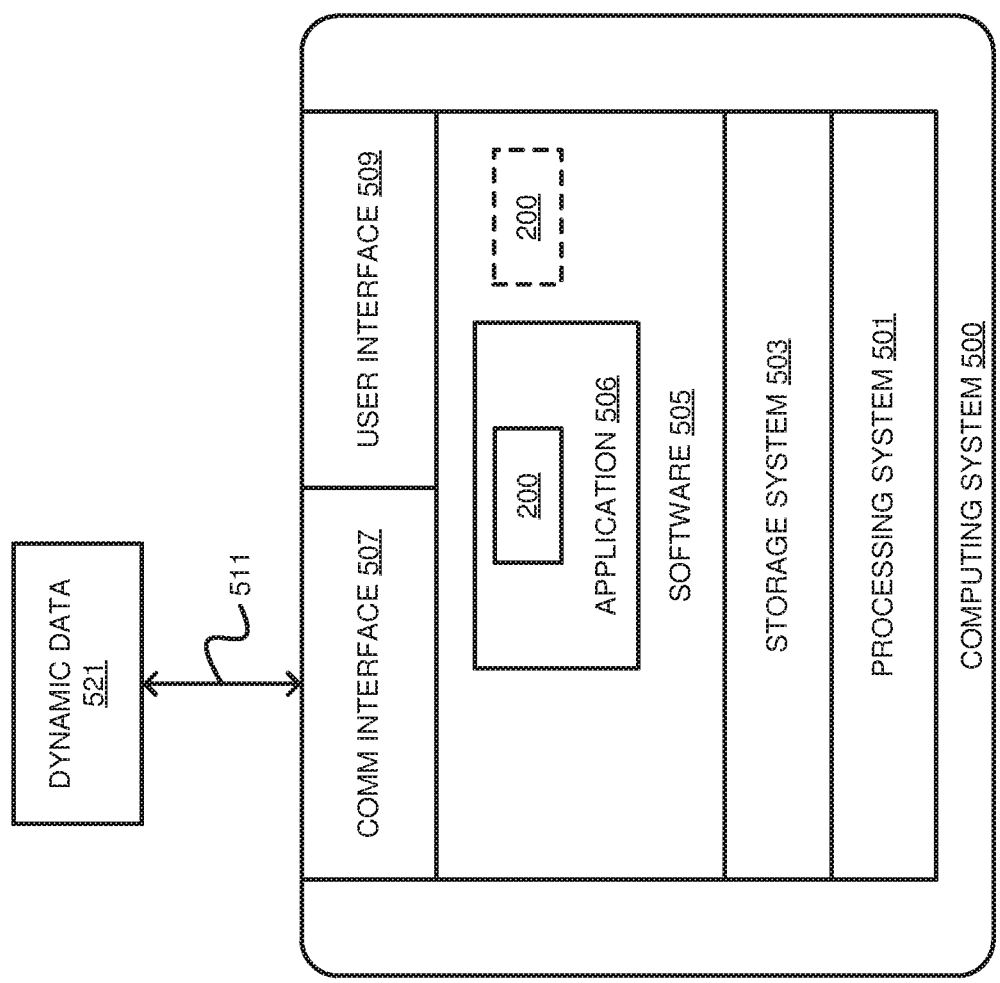
FIG. 5 is a block diagram that illustrates a computing system.

Referring now to FIG. 5, a block diagram that illustrates computing system 500 in an exemplary implementation is shown. Computing system 500 provides an example of web server 130, although server 130 could use alternative configurations. Computing system 500 could also provide an example of wireless communication device 101, although device 101 could use alternative configurations. Computing system 500 includes processing system 501, storage system 503, software 505, communication interface 507, and user interface 509. Software 505 includes application 506 which itself includes detection process 200. Detection process 200 may optionally be implemented separately from application 506. Application 506 could comprise a web service in some implementations.

Computing system 500 may be representative of any computing apparatus, system, or systems on which application 506 and detection process 200 or variations thereof may be suitably implemented. Examples of computing system 500 include mobile computing devices, such as cell phones, tablet computers, laptop computers, notebook computers, and gaming devices, as well as any other type of mobile computing devices and any combination or variation thereof. Note that the features and functionality of computing system 500 may apply as well to desktop computers, server computers, and virtual machines, as well as any other type of computing system, variation, or combination thereof.

Computing system 500 includes processing system 501, storage system 503, software 505, communication interface 507, and user interface 509. Processing system 501 is operatively coupled with storage system 503, communication interface 507, and user interface 509. Processing system 501 loads and executes software 505 from storage system 503. When executed by computing system 500 in general, and processing system 501 in particular, software 505 directs computing system 500 to operate as described herein for wireless communication device and/or web server 130 for execution of detection process 200 or variations thereof. Computing system 500 may optionally include additional devices, features, or functionality not discussed herein for purposes of brevity.

Referring still to FIG. 5, processing system 501 may comprise a microprocessor and other circuitry that retrieves and executes software 505 from storage system 503. Processing system 501 may be implemented within a single processing device but may also be distributed across multiple processing devices or sub-systems that cooperate in executing program instructions. Examples of processing system 501 include general purpose central processing units, application specific processors, and logic devices, as well as any other type of processing device, combinations, or variations thereof.

Storage system 503 may comprise any computer readable media or storage media readable by processing system 501 and capable of storing software 505. Storage system 503 may include volatile and nonvolatile, removable and non-removable media implemented in any method or technology for storage of information, such as computer readable instructions, data structures, program modules, or other data. Storage system 503 may be implemented as a single storage device but may also be implemented across multiple storage devices or sub-systems co-located or distributed relative to each other. Storage system 503 may comprise additional elements, such as a controller, capable of communicating with processing system 501. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, in conjunction with user interface 509, processing system 501 loads and executes portions of software 505, such as application 506 and/or detection process 200, to facilitate detection of real user interaction with mobile applications. When representative of web server 130, software 505 may be implemented in program instructions and among other functions may, when executed by computing system 500 in general or processing system 501 in particular, direct computing system 500 or processing system 501 to execute a server security component of a web service to extract user behavior attributes from a web service request and process the user behavior attributes to determine whether or not a mobile application is being operated by a human user. When representative of wireless communication device 101, software 505 may be implemented in program instructions and among other functions may, when executed by computing system 500 in general or processing system 501 in particular, direct computing system 500 or processing system 501 to execute a mobile application that generates a web service request, execute a client security component of the mobile application to include user behavior attributes in the web service request, and utilize a mobile application programming interface to transfer the web service request including the user behavior attributes for delivery to a web server.

Software 505 may include additional processes, programs, or components, such as operating system software or other application software. Examples of operating systems include Windows®, iOS®, and Android®, as well as any other suitable operating system. Software 505 may also comprise firmware or some other form of machine-readable processing instructions executable by processing system 501.

In general, software 505 may, when loaded into processing system 501 and executed, transform computing system 500 overall from a general-purpose computing system into a special-purpose computing system customized to facilitate detection of real user interaction with mobile applications as described herein for each implementation. For example, encoding software 505 on storage system 503 may transform the physical structure of storage system 503. The specific transformation of the physical structure may depend on various factors in different implementations of this description. Examples of such factors may include, but are not limited to the technology used to implement the storage media of storage system 503 and whether the computer-storage media are characterized as primary or secondary storage.

In some examples, if the computer-storage media are implemented as semiconductor-based memory, software 505 may transform the physical state of the semiconductor memory when the program is encoded therein. For example, software 505 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 500 is generally intended to represent a computing system with which software 505 is deployed and executed in order to implement application 506, detection process 200, and variations thereof. However, computing system 500 may also represent any computing system on which software 505 may be staged and from where software 505 may be distributed, transported, downloaded, or otherwise provided to yet another computing system for deployment and execution, or yet additional distribution. For example, computing system 500 could be configured to deploy software 505 over the internet to one or more client computing systems for execution thereon, such as in a cloud-based deployment scenario.

Communication interface 507 may include communication connections and devices that allow for communication between computing system 500 and other computing systems (not shown) or services, over a communication network 511 or collection of networks. In some implementations, communication interface 507 receives dynamic data 521 over communication network 511. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 509 may include a voice input device, a touch input device for receiving a gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 509. In some examples, user interface 509 could include a touch screen capable of displaying a graphical user interface that also accepts user inputs via touches on its surface. The aforementioned user input devices are well known in the art and need not be discussed at length here. User interface 509 may also include associated user interface software executable by processing system 501 in support of the various user input and output devices discussed above. Separately or in conjunction with each other and other hardware and software elements, the user interface software and devices may provide a graphical user interface, a natural user interface, or any other kind of user interface. User interface 509 may be omitted in some implementations.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system to facilitate detection of real user interaction with mobile applications, the method comprising:
   in a wireless communication device:
      executing a mobile application that generates a web service request for a web service;
      executing a client security component of the mobile application to determine user behavior attributes based on user interactions with the mobile application and transparently include the user behavior attributes in the web service request such that the user behavior attributes are transparent to the mobile application and the web service, wherein at least a portion of the user interactions that the user behavior attributes are based on are associated with user navigation of the mobile application; and
      utilizing a mobile application programming interface (API) to transfer the web service request including the user behavior attributes for delivery to a web server; and
   in the web server, executing a server security component of the web service to extract the user behavior attributes from the web service request and process the user behavior attributes to determine whether or not the mobile application is being operated by a human user.

2. The method of claim 1 further comprising, if the server security component of the web service determines that the mobile application is being operated by the human user, executing the server security component of the web service to validate the web service request based, at least in part, on the determination that the mobile application is being operated by the human user, and provide the web service request to the web service upon successful validation.

3. The method of claim 2 wherein the web server executing the server security component of the web service to provide the web service request to the web service upon successful validation comprises executing the server security component of the web service to remove the user behavior attributes from the web service request and provide the web service request without the user behavior attributes to the web service.

4. The method of claim 1 wherein the web server executing the server security component of the web service to process the user behavior attributes to determine whether or not the mobile application is being operated by the human user comprises executing the server security component of the web service to compare a total number of the user behavior attributes received in the web service request to a threshold number of attributes to determine whether or not the mobile application is being operated by the human user.

5. The method of claim 1 wherein the user behavior attributes comprise a velocity of navigation between views of the mobile application.

6. The method of claim 1 wherein the user behavior attributes comprise a sequence of navigation between views of the mobile application.

7. The method of claim 1 wherein the user behavior attributes comprise a velocity of textual input received by the mobile application.

8. A communication system to facilitate detection of real user interaction with mobile applications, the communication system comprising:
   a wireless communication device configured to execute a mobile application that generates a web service request for a web service and execute a client security component of the mobile application to determine user behavior attributes based on user interactions with the mobile application and transparently include the user behavior attributes in the web service request such that the user behavior attributes are transparent to the mobile application and the web service, and utilize a mobile application programming interface to transfer the web service request including the user behavior attributes for delivery to a web server computing system, wherein at least a portion of the user interactions that the user behavior attributes are based on are associated with user navigation of the mobile application; and
   the web server computing system configured to execute a server security component of the web service to extract the user behavior attributes from the web service request and process the user behavior attributes to determine whether or not the mobile application is being operated by a human user.

9. The communication system of claim 8 further comprising, if the server security component of the web service determines that the mobile application is being operated by the human user, the web server computing system is configured to execute the server security component of the web service to validate the web service request based, at least in part, on the determination that the mobile application is being operated by the human user, and provide the web service request to the web service upon successful validation.

10. The communication system of claim 9 wherein the web server computing system configured to execute the server security component of the web service to provide the web service request to the web service upon successful validation comprises the web server computing system configured to execute the server security component of the web service to remove the user behavior attributes from the web service request and provide the web service request without the user behavior attributes to the web service.

11. The communication system of claim 8 wherein the web server computing system configured to execute the server security component of the web service to process the user behavior attributes to determine whether or not the mobile application is being operated by the human user comprises the web server computing system configured to execute the server security component of the web service to compare a total number of the user behavior attributes received in the web service request to a threshold number of attributes to determine whether or not the mobile application is being operated by the human user.

12. The communication system of claim 8 wherein the user behavior attributes comprise a velocity of navigation between views of the mobile application.

13. The communication system of claim 8 wherein the user behavior attributes comprise a sequence of navigation between views of the mobile application.

14. The communication system of claim 8 wherein the user behavior attributes comprise a velocity of textual input received by the mobile application.

15. An apparatus comprising:
one or more non-transitory computer-readable storage media; and
first program instructions stored on the one or more non-transitory computer-readable storage media that, when executed by a wireless communication device, direct the wireless communication device to at least:
execute a mobile application that generates a web service request for a web service;
execute a client security component of the mobile application to determine user behavior attributes based on user interactions with the mobile application and transparently include the user behavior attributes in the web service request such that the user behavior attributes are transparent to the mobile application and the web service, wherein at least a portion of the user interactions that the user behavior attributes are based on are associated with user navigation of the mobile application; and
utilize a mobile application programming interface (API) to transfer the web service request including the user behavior attributes for delivery to a web server; and
second program instructions stored on the one or more non-transitory computer-readable storage media that, when executed by the web server, direct the web server to at least:
execute a server security component of the web service to extract the user behavior attributes from the web service request and process the user behavior attributes to determine whether or not the mobile application is being operated by a human user.

16. The apparatus of claim 15 wherein the wireless communication device is operatively coupled to the one or more non-transitory computer-readable storage media and the wireless communication device reads and executes the first program instructions.

17. The apparatus of claim 15 wherein the web server is operatively coupled to the one or more non-transitory computer-readable storage media and the web server reads and executes the second program instructions.

18. The apparatus of claim 15 further comprising, if the server security component of the web service determines that the mobile application is being operated by the human user, the second program instructions further direct the web server to execute the server security component of the web service to validate the web service request based, at least in part, on the determination that the mobile application is being operated by the human user, and provide the web service request to the web service upon successful validation.

19. The apparatus of claim 18 wherein the second program instructions, to direct the web server to execute the server security component of the web service to provide the web service request to the web service upon successful validation, direct the web server to execute the server security component of the web service to remove the user behavior attributes from the web service request and provide the web service request without the user behavior attributes to the web service.

20. The apparatus of claim 15 wherein the second program instructions, to direct the web server to execute the server security component of the web service to process the user behavior attributes to determine whether or not the mobile application is being operated by the human user, direct the web server to execute the server security component of the web service to compare a total number of the user behavior attributes received in the web service request to a threshold number of attributes to determine whether or not the mobile application is being operated by the human user.

* * * * *